3 Sheets—Sheet 1.

S. B. SEXTON.

Heating Stove.

No. 1,774. Reissued Sept. 27, 1864.

Witnesses
R. T. Campbell
Q. Schafer

Inventor
S. B. Sexton
by his atty.
Mon. Lieb. Haines

N. PETERS, Photo-Lithographer, Washington, D. C.

3 Sheets—Sheet 2.

S. B. SEXTON.

Heating Stove.

No. 1,774.

Reissued Sept. 27, 1864.

Witnesses
R. T. Campbell
P. Shafer.

Inventor
S. B. Sexton
by his atty.
Munn & Co.

N. PETERS, Photo-Lithographer, Washington, D. C.

S. B. SEXTON.
Heating Stove.
No. 1,774. Reissued Sept. 27, 1864.
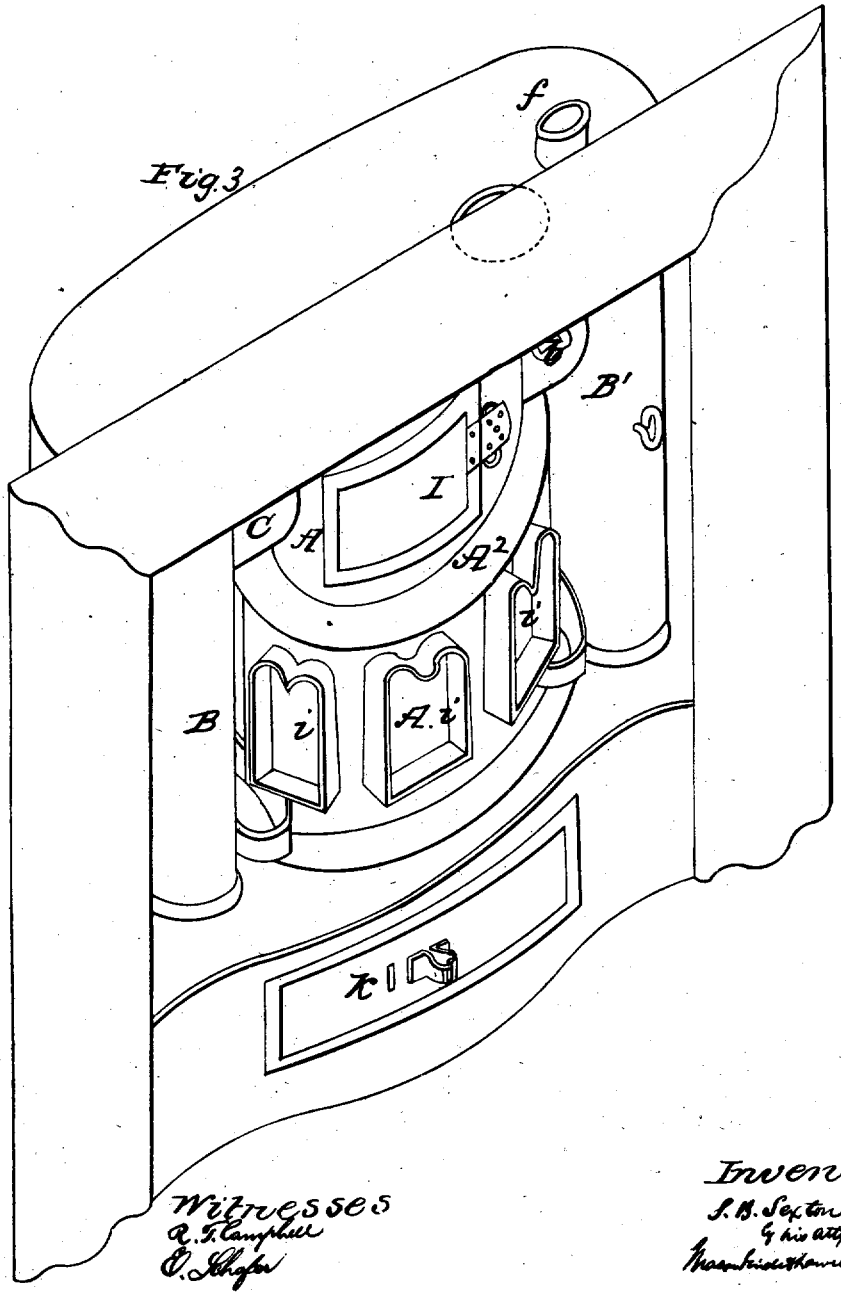
Witnesses
R. F. Campbell
O. Schafer
Inventor
S. B. Sexton
by his atty.
Thos. Ewbank Stevenson
N. PETERS, Photo-Lithographer, Washington, D. C.

UNITED STATES PATENT OFFICE.

SAMUEL B. SEXTON, OF BALTIMORE, MARYLAND.

IMPROVEMENT IN STOVES.

Specification forming part of Letters Patent No. 23,716, dated April 19, 1859; Reissue No. 1,242, dated December 3, 1861; Reissue No. 1,621, dated February 16, 1864; Reissue No. 1,774, dated September 27, 1864

*To all whom it may concern:*

Be it known that I, S. B. SEXTON, of Baltimore, State of Maryland, have invented a new and useful Improvement in Magazine Base-Burning Stoves for Heating or Warming Purposes; and I do hereby declare that the following is a full, clear, and exact description of the same, reference being had to the accompanying drawings, forming part of this specification, in which—

Figure 1:
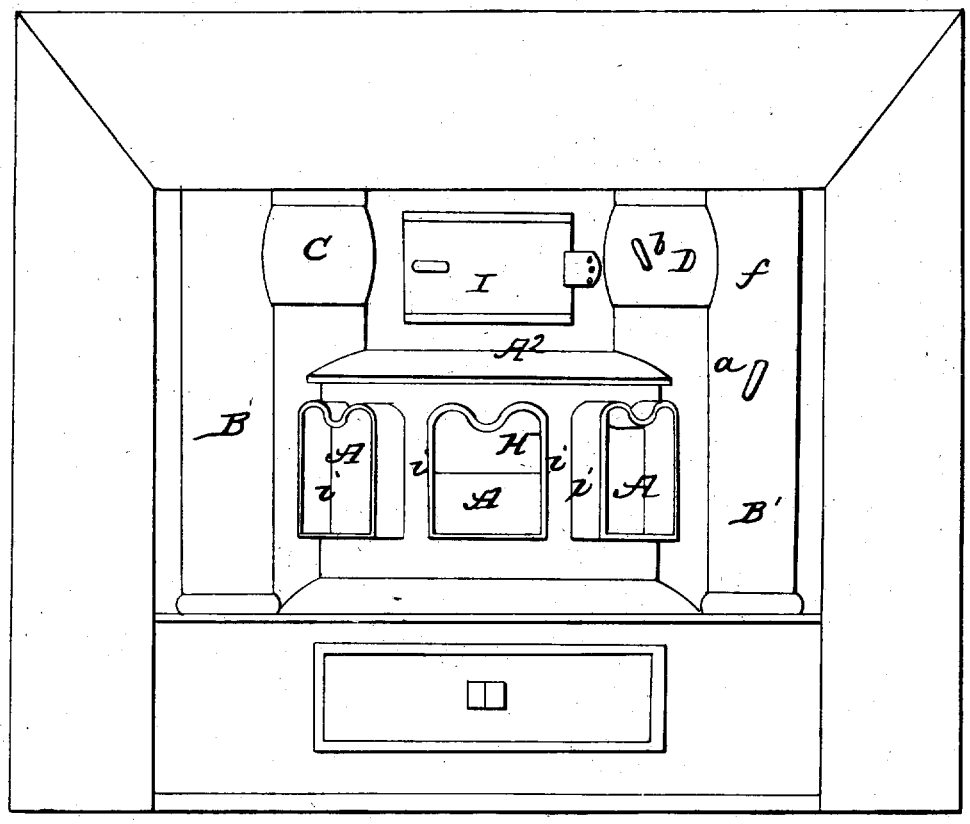
Figure 2:
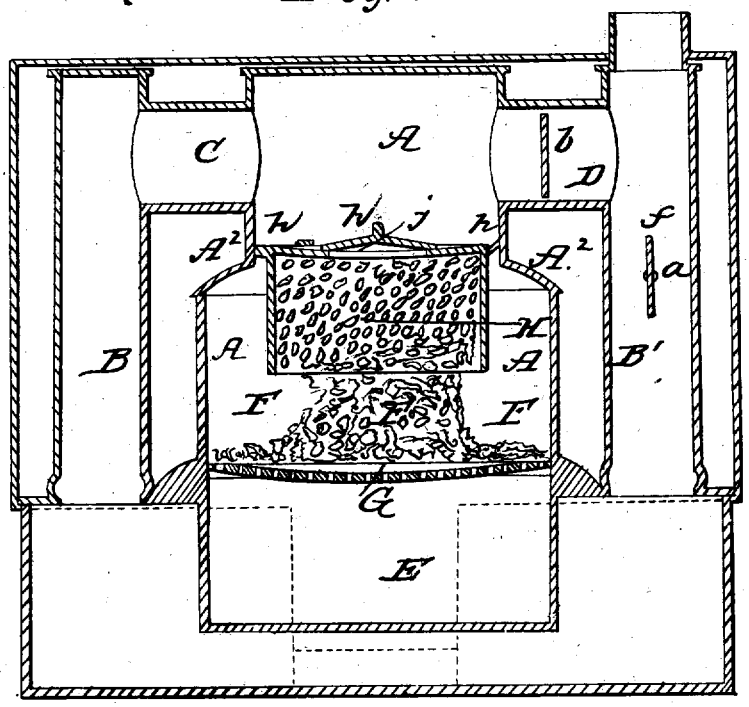

Figure 1 is a front elevation of a stove with my invention applied to it. Fig. 2 is a vertical longitudinal section of the same. Fig. 3 is a perspective view of a stove with my invention applied to it.

Similar letters of reference in the several figures indicate corresponding parts.

To make a good and practical magazine base-burning stove for heating and illumination purposes, it is essential to adopt the following features of construction.

First. To have a free, enlarged space between the lower end of the magazine and the grate or fire-bed upon which the pile of coals rests, and this space should extend (all around) outwardly, both below and around the lower free end of the magazine, and also be wholly unobstructed from said lower end, both out to the wall of the stove and down to the outer edge of that part of the stove which constitutes the fire-bed. By adopting this feature of construction, which I believe to be my invention, a sufficient amount of heat from this class of stoves is secured from a given amount of fuel, for the coal which is constantly being supplied from the magazine will freely spread out laterally (all around) from the lower end of the magazine in the form of a truncated cone, the base of which will extend to or nearly to the outer wall of the stove, or to the lining thereof. To thus have the coals spread out upon a large base (all around) and stand (in a free space) in a conical pile, instead of having them deposit into a grated cylindrical fire-pot or into a deep perpendicular-sided pit, is of vital importance, for the coals burn freely in thin layers on my plan from the largest diameter of the cone pile to the smallest diameter thereof, and at all intermediate points at one and the same time. In a word, the coal is burned on the surface of the entire cone pile in thin layers and in a free space at one time, such space being between the conical pile and the wall of the stove. The effect of thus burning the coal is obvious; but it may be important to state that the flame strikes directly upon the walls of the stove, and the intensest heat is radiated into the room.

Second. The wall of the stove should have illumination doors or windows in it, and these illuminators should always be between the base of the conical pile of coals and top of the fuel-magazine or opposite some part of the free space in which the gases burn with a bright flame. Further, they should be so located that the burning or but partially-ignited coals shall not be allowed to pile up against them; and to have it certainly understood as to where I desire these windows located I will state that their lower end should at least be as high, if not higher, than the point where the spreading of the coals is arrested. By thus locating the windows opposite the free space or between the base and top of the conical pile, and having the magazine arranged over a free space which is between it and the fire-bed, (the combination, I believe, is my invention,) the light from a bright, free flame of gas is unobstructedly transmitted through the windows into the room, and the most cheerful effect is produced, while every desired comfort from heat of the stove is secured. In this connection I would state that to prevent rapid destruction and discoloration of the mica, or other translucent media of which the windows are usually made, from direct contact of flame these windows are best if set out in relief from the exterior of the cylinder-frame or body of the stove, and for convenience of cleaning and renewing the mica, as well as kindling the fire through the window-frames, these doors or windows should be made removable or capable of being opened. I believe that the kindling under the magazine through the illumination-windows, and also the setting of the windows in relief, are inventions of my own in connection with this class of stoves.

Third. A gas or partially-spent-gas space around the upper portion of the magazine should be formed, so that the gases will circulate in contact with the circumference of the magazine, this space communicating with the free space which is between the magazine and fire-bed and between the lower part of the magazine and the illumination-wall of the stove, this space allowing the gases to circulate in contact with the circumference of the magazine in their passage to the draft-flue, thus heating the upper part of the stove and magazine, and keeping the coals in the magazine at such a temperature as will insure a ready and perfect emission of their expanded gases down through the incandescent pile of coal. This feature of construction in connection with the illumination-chamber and the enlarged free coal-spreading space below the magazine I regard as my own invention.

Fourth. To increase the beneficial result of heating the upper part of the stove, secured from the third feature of construction above referred to, and also to prevent ignition of the coal in the upper part of the magazine, it is advisable in many cases, if not in all, to have the products of combustion circulate over the cover of the magazine and in immediate contact with it, for as these products contain but little atmospheric air they act as a packing to prevent such air finding an ingress into the top of the magazine.

My invention is applicable to stoves with a single cylinder or to stoves with side columns which serve as diving-flues, such stoves in either case standing out in the room. It is also applicable, as represented, to fire place stoves; but as I have patented the fire-place stove under a separate patent, I do not here claim that application of the invention.

To enable others skilled in the art to make and use my invention, I will proceed to describe the same.

A is the main or lower part of the stove, constituting with its own wall the combustion-chamber. The interior lower portion of this chamber may be, as usual, lined with fire-brick or other durable material. I generally use brick beveled off on their inner upper corner in such manner as to form a flaring or inclined fire-bed around the edge of the grate. The grate G, upon which the conical pile of burning coals rests, may be slightly concave on its upper surface, so as to receive the falling coals properly. It is not material whether the old horizontal or convex grate be adopted in place of this slightly-concave grate. It is essential, however, that the bed upon which the base of the conical pile of coals rests be so constructed that the coals may spread out toward the wall of the stove beyond the lower end of the magazine H. It is also essential to supply sufficient air up through the fire-bed or grate to keep up a lively combustion of the coal. To this end I have made the grate G equal in diameter to the lower end of the combustion-chamber, less the thickness of the fire-brick. To heat all parts of this lower or main chamber of the stove, the fire-bed should extend out (all around) beyond the lower end of the magazine, at least the upper edge of the bed should be thus extended, whether the grate itself be smaller or larger than the lower end of the magazine. Under the fire-bed or grate the usual ash-pan is placed in a base, E, which base may be constructed, either hollow or solid, around or beneath the ash-pan in any of the known ways. Through the wall A illumination apertures *i* are formed. These apertures are located above the point where the broadest or base portion of the conicle pile of burning coals rests, and in such relation to the lower end of the magazine H that the falling and spreading conical pile of coals cannot come up against them. Around the outer edge of each of the apertures a projecting window or door frame is formed, into the front part of which mica or other transparent material adapted to transmit light is placed. Through these apertures, by removing or opening the windows or doors, the fire may be kindled on the grate under the magazine. From the drawings the relative location of the windows will be seen.

A′ is the upper portion of the stove. This may only communicate directly with a chimney-flue, *f*, by a branch, D, located at its back or at any other point desired; or it may have one or more side columns, B B′, leading into the hollow base, and connecting thus indirectly with the chimney-flue *f*, the respective columns or flues to be controlled by dampers *a* or *b*. The arrangement of flues and dampers, however, is no part of my claim under this patent, except so far as they form necessary connections with my invention to enable me to make it useful and practical in a stove for warming purposes. This portion A′ of the stove is furnished with a door, I, so that coal may be introduced into the apartment A. The location of the door may be such as to suit circumstances or the style of the stove.

H is the magazine or coal-reservoir from which the fire is continuously fed. This magazine is closed at top, except at its center, where a hole, *j*, is cut. This is the supply-hole, and the same is closed with an adjustable cover, *h*. The diameter of this magazine is less than that of any part of the interior diameter of the stove, and it is arranged vertically within the stove, so that its lower end generally reaches down about midway of the depth of the portion A. The upper end of the magazine may extend more or less up into the part A′ of the stove. There is a space or chamber between the inner side of the stove and the outer side of the magazine, and at the point where the gases of the fire escape from the part A into A′ it is more advantageous to have a contraction of the gas-passage *p p* by means of a horizontal or nearly horizontal plate than it is to have both chambers or parts A A′ connect directly. In the drawings I have shown one way of contracting this passage or gas-space, as illustrated at $A^2$; but inasmuch as the reverberation of the gases at this point is the object desired to be accomplished by such contraction, and such result may be produced in various analogous ways to that shown, I do not limit myself to this exact construction.

In locating the supports of the magazine it is advisable to place them as far out of contact with the incandescent mass of coals as practicable, in order to save them from rapid destruction from the heat. In the drawings they are shown as being at the upper end of the fuel-magazine at the points where the letters *p p*, which designate the gas-space, are placed; but, so far as the principle of operation of my invention is concerned, the effect would be very nearly the same if the magazine were supported by supports located at any other point on the wall of the stove above the grate or fire-bed.

When the magazine is most properly applied within the stove, there will be a space between the supports, all around the magazine, and between the wall of the stove and the magazine. There will also be an unobstructed space, F, below the magazine, extending to the wall of the stove, or to the lining thereof. There will likewise in most cases be a space for circulating the products of combustion above the magazine and in contact with the cover thereof. This latter, however, is rather a furtherance of the beneficial effects of my main improvements than an absolute prerequisite. All of the said spaces communicate with one another and terminate in the draft-flue *f*. Thus the gases or products of combination circulate in contact with the interior of the upper part of the stove, and also around and below the magazine.

One of the leading features of my invention is a stove with a fuel-magazine so applied in it that the highly-inflamed gases are thrown off in an undivided body from the entire surface of a conical pile of burning coals, which occupies a larger area than the superincumbent supply in the magazine, directly against the radiating-surface of the stove at points below the end of the magazine, such inflamed gases being emitted into a free space, and rising opposite illumination-windows which are opposite said space, and then passing into the space between the upper part of the stove and the upper part of the magazine. By this feature the most perfect combustion, radiation, and illumination are secured.

The most advantageous manner of using the stove represented is as follows: To kindle the fire the damper *b*, the door I, and the draft door or slide *k* of the ash pan are opened, the cover *h* removed, and a plentiful supply of kindling placed on the grate G, under the magazine, through the apertures of the illumination-window frames. The kindling being ignited, a moderate supply of coal is introduced into the magazine and the door I closed. The draft being now directly upward through the fuel-magazine, the coal is in short time thoroughly ignited. The fuel-magazine is now to be completely filled with hard coal, the cover *h*, closed upon the opening *j*, and the door I shut. When this mass of coal is sufficiently heated throughout, the damper *b* is partly or wholly closed—that is, if no diving-flues are used; but if diving-flues are used, the damper *b* may always be kept entirely closed after the fire is fully started, and a damper, *a*, be used as the regulator in connection with the draft door or slide *k*. I have found that the stove, when in full burning or blast, will burn slowly with both dampers and the draft-door closed or nearly closed, and it is advisable to thus adjust the regulators on going to bed, as the fuel will then consume but slowly during the night. The coal in the part A of the stove being perfectly incandescent outside of the circumferential range of the magazine when the fire is at full blast, the greatest possible amount of heat and light are evolved and emitted, and as the front of the stove or the whole body of the part A of the stove is provided with windows directly opposite a free space and the incandescent mass of fuel, and as all descending gases from the reserve-supply coal are burned with a bright flame as they pass over the red coals, a brilliant and cheerful appearance is presented to view.

I will here remark that I mean by the term "thin layers" that the coal on the surface of the conical pile presents a step-like arrangement, and therefore each step on the surface may be designated as a "layer," which layers, respectively, as they rise on the cone decrease in diameter.

What I claim as my invention, and desire to secure by Letters Patent, is—

1. A stove for warming or heating purposes, constructed with a fuel-magazine supported free from the grate, and a combustion-chamber having a fire-bed or base-burning surface of a greater diameter than the fuel-magazine, so arranged and constructed that the fuel may spread out laterally and form a conical pile and burn in thin layers, and so that the inflamed gases may rise or circulate in a free space as they are evolved from the entire outer surface of the burning conical pile of coals, substantially as and for the purposes set forth.

2. In combination with the subject-matter of the first claim, constructing the combustion-chamber A with projecting window-frames, substantially as and for the purpose described.

3. A stove for warming purposes, embracing the features of construction mentioned in my first claim and the additional feature of the gas or products of combustion circulating-apartment above and around the upper portion of the magazine, substantially as and for the purposes set forth.

4. A stove for warming purposes, wherein the spreading of the coals in a lateral direction from the lower end of the magazine is wholly unobstructed all around, and at the same time the combustion-chamber proper is formed by the outer wall of the stove, and the products of combustion circulate underneath, around, over, and in contact with the magazine, whatever may be the form and relative proportions of the parts, substantially as and for the purposes described.

5. The combination of a fuel-supply magazine, H, which has its lower end free from the fire-bed G, with unobstructed space below it where the fuel may spread out laterally and burn in a conical pile and in thin layers, with a stove which has illumination doors or windows in its wall A, so constructed and arranged that the fire may be kindled through the apertures or door-frames, substantially as set forth.

6. The combination of the free space F, illumination space or wall A, and gas-circulating space *p* around the upper part of the circumference of the magazine H, in a magazine-stove, substantially as and for the purposes described.

S. B. SEXTON.

Witnesses:
SAML. McCOY,
JOHN JOSEPH FULLER.